Oct. 22, 1929.  E. HACK  1,732,269
REBOUND DAMPER FOR VEHICLE SUSPENSION SPRINGS
Filed July 18, 1928
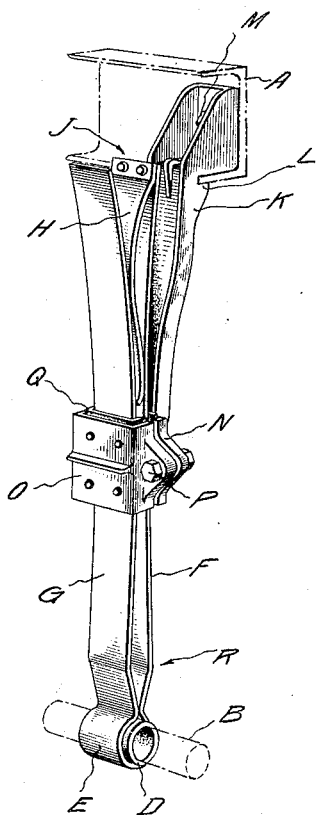
Inventor:
Edwin Hack Patented Oct. 22, 1929

1,732,269

UNITED STATES PATENT OFFICE

EDWIN HACK, OF HOMEBUSH, NEAR SYDNEY, AUSTRALIA

REBOUND-DAMPER FOR VEHICLE SUSPENSION SPRINGS

Application filed July 18, 1928, Serial No. 293,689, and in Australia April 23, 1928.

This invention relates to dampers for suppressing oscillatory movement of the suspension springs of automobiles and other wheeled vehicles, and it consists in improvements in that class of such dampers in which a drag bar which is attached at one end of it to the spring is frictionally embraced in a clamp which is fixed on the vehicle frame, so that the friction to which the drag bar is subjected when it is slid through the clamp will impose damping on the oscillations of the suspension spring.

The device in which the present invention consists comprises a flat bar of spring steel bent midway its length so as to form two nearly parallel members with an eye at the bend to serve for pivotal attachment to a lug on the spring (or on the axle which the spring carries), a leaf type spreader spring fitted between said parallel members near their free ends, and a clamp box covered on its interior face with "brake lining" fabric. The clamp box is split to facilitate construction and assembly, the two sections of it being fixed together by bolts, and one of these sections is carried on the end of a bracket which is adapted to be bolted to the chassis frame.

The accompanying drawing illustrates the device in perspective view, parts of the chassis frame and the lug which connects the eye of the drag bar to the spring or axle of the car being shown in dotted lines.

A is a part of the chassis frame of a car, and B is a stud, bolt, or lug which is carried by any convenient attachment on the axle or on the crown of an elliptic leaf spring (or in the case of a cantilever spring on the free end of the bearer leaf). D is a bush of "brake lining" material, vulcanized rubber, or like material, which is optionally fitted to take the bearing of the stud B in the rolled eye E which is formed in the bend of the drag bar when it is doubled to form two leaf members F and G. H is a curved leaf spreader spring, consisting of one or more leaves. One end of it is riveted at J to the top end of the leaf F, and it bears outwardly against the leaf G. It functions to move the leaves F and G apart with greater or less force depending on its stiffness.

K is a stamped or cast steel bracket which is shaped at the head to seat in the channel of the frame A and may be notched at L to engage the edge of the lower flange; it is fixed to the chassis frame member A by one or more bolts or rivets M. At its bottom end it carries the rear section N of the clamp box. The front section O of the clamp box is butted up to the rear section N and is secured to it by two bolts P. Shims are fitted between the abutting faces to provide for adjustment of pressure between the drag bars and the lined surfaces of the clamp box, thus to accommodate the friction to the requirements of each particular vehicle to obtain the best results. Q is a friction lining of wired asbestos fabric or like frictional substance such as is commonly used for lining brake bands. The friction lining is fixed by riveting to the two sections of the box. The clamp box is open at top and bottom, and the drag leaves F and G pass through it. The spreader spring H forces these leaves apart, causing them to press respectively against opposite lined interior surfaces of the two sections of the clamp box N, O.

The clearance between the drag leaves F and G at the bends at R above the eye E is a little more than the interior width of the clamp box. Consequently, when the drag leaves F—G are forced upward through the clamp box N, O they bear with gradually increasing pressure against the friction lining. Resistance to compression flexure of the suspension spring is thus obtained progressively in the last portion of the suspension spring movement, when that movement is greater than the normal range within which comfortable riding is obtained; the clamp box is positioned appropriately so that the bends at R will not come into the clamp box when the suspension spring is at full compression.

In the mid range of the oscillations of the suspension spring, the drag leaves F—G are embraced in the clamp box about midway of their length. At this position they bear on the lined surfaces with minimum pressure and consequently minimum damping on the flexing of the suspension spring is imposed by their movement. In the rebound movement of the suspension spring, the leaves F—G are drawn down through the clamp box; in this movement the damping, starting from the neutral position of the suspension spring, increases progressively, the spreader spring H being tensioned gradually as the leaves F—G come towards each other as they are drawn down through the clamp box N, O.

The clamp box is quite rigid. In certain known constructions of "shock absorbers" a drag leaf is drawn through a frictional device having a movable part backed by springs which compress as the downward movement of the leaf progresses. This arrangement is found unsatisfactory as looseness develops in use, noise results, and the behaviour of the device becomes irregular.

The bar which is bent to form the pair of drag leaves F—G is a flat section bar of spring steel. Its sectional dimensions and its length will vary according to the weight and proportions of the vehicle on which the device will be used. For a touring car weighing about 3000 lbs. empty, the bar is constructed of spring steel measuring about two inches in width by an eighth of an inch more or less in thickness. Across the bends at R the measurement is about an eighth of an inch more or less greater than the clearance within the clamp box, so that at the extreme compression position of the suspension spring the leaves are forced together about an eighth of an inch as flexure takes place at the bends R. In the case of vehicles which do not require damping on the suspension compression movement, the bends R are omitted. Damping then occurs only in the rebound movement of the suspension springs.

The leaves F—G are curved reversely as shown in the drawing owing to the fact that they are held apart at the bends R at the eye end and are spread apart at the free ends by the leaf spring H. The leaf spring H may be a single, double, or triple leaf spring. A single leaf procures effective operation.

The spread apart of the leaves F—G at the bends R is proportioned to procure the desired measure of pressure on the lined surfaces of the clamp box and therefore the desired degree of progressive damping on the compression movement of the suspension spring. The stiffness of the spreader spring H is proportioned to procure the desired measure of pressure on the lined surfaces of the clamp box and therefore the desired degree of progressive damping on the rebound flexure of the suspension spring.

The described arrangement of attachment of the clamp box and the drag bar may be reversed, the clamp box being then fixed to the axle or the spring, and the eye of the drag bar carried by a lug on the chassis frame.

What I claim as my invention and desire to secure by Letters Patent is:—

1. A suspension spring damper comprising a drag bar of spring steel bent on itself to form a pair of leaves and having an eye formed at the bend for pivotal engagement with a member attached to a suspension spring, a spreader spring having one or a plurality of leaves disposed between the free ends of the pair leaves of said drag bar, said spreader leaf spring being fixed to one of said drag bar leaves and bearing against the other of them, said drag bar leaves embraced in and slidable through a clamp box which is split vertically, is open at top and bottom, and has one part of it fixed to a chassis frame bracket and the two parts of it bolted together rigidly, and friction lining on opposite interior faces of said clamp box.

2. A suspension spring damper according to claim 1, having the slidable drag bar pair leaves bent outwardly above the eye to spread them a greater distance apart than the opposite lined surfaces of the clamp box thereby to procure progressive frictional resistance to the inward movement of the drag bar leaves through the clamp box.

In testimony whereof I affix my signature.

EDWIN HACK.